US012789403B2

(12) United States Patent
Blaine

(10) Patent No.: US 12,789,403 B2
(45) Date of Patent: Nov. 10, 2026

(54) SYSTEM OF CUTTING A HOMOGENEOUS WORK PRODUCT INTO NATURAL SHAPES WITH RANDOMNESS

(71) Applicant: JBT Marel Corporation, Chicago, IL (US)

(72) Inventor: George R. Blaine, Lake Stevens, WA (US)

(73) Assignee: JBT Marel Corporation, Chicago, IL (US)

( * ) Notice: Subject to any disclaimer, the term of this patent is extended or adjusted under 35 U.S.C. 154(b) by 883 days.

(21) Appl. No.: 17/645,355

(22) Filed: Dec. 21, 2021

(65) Prior Publication Data

US 2022/0203569 A1 Jun. 30, 2022

Related U.S. Application Data

(60) Provisional application No. 63/130,565, filed on Dec. 24, 2020.

(51) Int. Cl.
*B26D 5/00* (2006.01)
*B26F 1/38* (2006.01)

(52) U.S. Cl.
CPC ............ *B26D 5/007* (2013.01); *B26F 1/3813* (2013.01); *B26D 2005/002* (2013.01); *B26D 2210/02* (2013.01)

(58) Field of Classification Search
CPC ... B26D 5/00; B26D 5/007; B26F 1/38; B26F 1/3806; B26F 1/3813; B26F 1/382–3833
See application file for complete search history.

(56) References Cited

U.S. PATENT DOCUMENTS 4,576,071 A * 3/1986 Rayment .................. B26D 5/32
83/365
6,198,834 B1 * 3/2001 Belk ......................... G06T 7/90
382/110

(Continued)

FOREIGN PATENT DOCUMENTS

GB 2409801 A 7/2005
GB 2421676 A 7/2006

OTHER PUBLICATIONS

International Search Report and Written Opinion mailed Apr. 28, 2022, issued in corresponding International Patent Application No. PCT/US2021/064641, filed Dec. 21, 2021, 12 pages.

(Continued)

*Primary Examiner* — Ghassem Alie
*Assistant Examiner* — Richard D Crosby, Jr.
(74) *Attorney, Agent, or Firm* — Christensen O'Connor Johnson Kindness PLLC

(57) ABSTRACT

A system 10 may be used to carry out methods for portioning substantially uniform food products 12 into a series of intentionally created unique variations of one or more predetermined reference shapes to resemble naturally occurring food product shapes. The method includes scanning the uniform food product and generating digital data based on the results of the scanning. This data is used to generate a series of unique variations of one or more predetermined reference shapes based on one or more specified physical parameters for the unique variation shapes. Cutting paths are generated for cutting the substantially uniform food product 12 into the digitally generated unique variation shapes 44. A control system 30 controls the operation of a cutting apparatus 22 cut the substantially uniform food product 12 along the generated cutting paths thereby portioning the substan- (Continued)

tially uniform food product into unique variations of naturally occurring food product shapes.

19 Claims, 10 Drawing Sheets

(56) References Cited

U.S. PATENT DOCUMENTS

| | | | | |
|---|---|---|---|---|
| 7,153,203 | B2 * | 12/2006 | Pfarr | B23K 26/0838 83/72 |
| 7,621,806 | B2 * | 11/2009 | Bottemiller | A22C 17/0086 700/173 |
| 7,841,264 | B2 * | 11/2010 | Kim | B26D 7/018 83/13 |
| 8,373,749 | B2 * | 2/2013 | Burton | G06T 7/0004 83/73 |
| 8,387,522 | B2 * | 3/2013 | Rusko | B26D 5/007 99/485 |
| 9,008,824 | B1 | 4/2015 | Blaine et al. | |
| 9,327,419 | B2 * | 5/2016 | Gallucci | B26D 5/005 |
| 9,983,572 | B2 * | 5/2018 | Pfarr | B26D 1/28 |
| 10,596,601 | B2 * | 3/2020 | Yoon | B07C 5/362 |
| 10,843,362 | B2 * | 11/2020 | Grasselli | B26D 5/007 |
| 10,869,489 | B2 * | 12/2020 | Blaine | A22C 17/0086 |
| 10,994,375 | B2 * | 5/2021 | Weedlun | B23K 26/0344 |
| 11,937,612 | B2 * | 3/2024 | Kjær | A22C 25/18 |
| 12,162,177 | B2 * | 12/2024 | Schmeiser | B26D 5/34 |
| 2007/0061771 | A1 * | 3/2007 | Habitz | G03F 1/36 716/52 |
| 2007/0214923 | A1 * | 9/2007 | Maier | B26D 5/007 83/37 |
| 2008/0077101 | A1 * | 3/2008 | Waksmundzki | A61F 13/5622 83/13 |
| 2010/0116014 | A1 * | 5/2010 | Goda | B21D 22/28 83/40 |
| 2011/0154969 | A1 * | 6/2011 | Weber | A22C 17/0086 83/520 |
| 2012/0097002 | A1 * | 4/2012 | Thiedig | G01B 11/046 83/365 |
| 2012/0198974 | A1 * | 8/2012 | Weber | B26D 5/007 83/365 |
| 2013/0074667 | A1 * | 3/2013 | Weber | B25J 11/0045 83/72 |
| 2013/0104380 | A1 * | 5/2013 | Felber | B26F 1/38 29/650 |
| 2013/0133490 | A1 * | 5/2013 | Schmeiser | A22C 17/0033 83/13 |
| 2013/0167700 | A1 * | 7/2013 | Weber | B26D 7/01 83/437.1 |
| 2013/0319196 | A1 * | 12/2013 | Schmeiser | B26D 5/02 83/13 |
| 2015/0135921 | A1 * | 5/2015 | Martinez-Montes | B26D 7/0625 83/365 |
| 2015/0224667 | A1 * | 8/2015 | Weber | B26D 7/0683 83/23 |
| 2016/0271822 | A1 * | 9/2016 | Burk | B26D 7/08 |
| 2018/0027848 | A1 * | 2/2018 | Blaine | A22C 17/0086 |
| 2018/0158537 | A1 * | 6/2018 | Blaine | B26F 3/004 |
| 2019/0327985 | A1 | 10/2019 | Finnsson et al. | |
| 2020/0068909 | A1 * | 3/2020 | Blaine | G05B 19/4166 |

OTHER PUBLICATIONS

Prepared Foods, “Eat Just Makes History With Restaurant Debut of Cultured Meat: Good Meat Cultured Chicken Launches at 1880 in Singapore,” Dec. 2020, BNP Media, 4 pages.

Office Action mailed Oct. 20, 2025, in corresponding Israeli Patent Application No. 303777, filed Dec. 21, 2021, 3 pages.

* cited by examiner

SYSTEM OF CUTTING A HOMOGENEOUS WORK PRODUCT INTO NATURAL SHAPES WITH RANDOMNESS

CROSS-REFERENCE TO RELATED APPLICATION

This application claims the benefit of U.S. Provisional Application No. 63/130,565, filed Dec. 24, 2020, the entire contents of which are hereby incorporated by reference.

BACKGROUND

Various food products are formed in a substantially uniform configuration, especially food products that are created by combining constituents. Examples include plant-based meat or other protein products, which may be extruded or otherwise formed into discrete, uniform sheets or perhaps as a continuous uniform sheet. Currently, such products are cut into uniform portions that may or may not resemble the shape of a naturally occurring food product. It is advantageous if the portions resemble natural products, and even more advantageous if the portions are random in shape while resembling a natural product. For example, when portioning a sheet of plant-based protein into chicken breast fillets as an entree dinner item, it would be desirable if the chicken fillets were variable in shape while still resembling a chicken breast. The same would be true if the sheet of plant-based protein were portioned into chicken nuggets or fillets for chicken burgers.

As another example, when portioning plant-based protein into a pork or beef riblets to serve as an entree or for use in a riblet sandwich, it would be advantageous if the perimeter shapes of the riblets were to vary from inexact rectangular form. It would also be advantageous if the top and/or bottom surfaces of the riblet were to be contoured to resemble a natural product. If the plant-based material were extruded so that the cross-sectional shape of the extrusion corresponded to the shape of the riblet when viewing from above, the extrusion could be transversely cut in a manner to provide contour to the top and/or bottom surfaces of the riblet. Moreover, if also desired, the outer perimeter of the riblet may be processed by trimming, or by other means, so that the outer perimeter does not define an exact rectangle corresponding to the cross-sectional shape of the extruder.

The present disclosure seeks to portion a substantially uniform raw material into intentionally or purposefully created unique variations of naturally occurring shapes, including, food product shapes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, portioning a substantially uniform work product into a series of unique variations of one or more predetermined reference shapes to resemble naturally occurring product shapes includes: digitally generating a series of unique variations of the one or more predetermined reference shapes based on specified physical parameters for the variation shapes; generating cutting paths for portioning the substantially uniform work product into the generated variation shapes; controlling the operation of one or more cutters to cut the substantially uniform work product along the generated cutting paths thereby portioning the substantially uniform work product into unique variations of naturally occurring work product shapes.

In any of the embodiments described herein, further including digitally generating the series of unique variation shapes by specifying a physical parameter of the one or more reference shapes by a plurality of points; and allowing the points to vary randomly in at least one direction.

In any of the embodiments described herein, wherein the specified physical parameter of the one or more reference shapes is the perimeter of the one or more reference shapes; and allowing the points to move randomly in the X and Y directions.

In any of the embodiments described herein, further comprising limiting the extent of movement of at least some of the point in the X and/or Y direction.

In any of the embodiments described herein, wherein the points are positioned along the perimeter of the one or more reference shapes in a non-uniform manner.

In any of the embodiments described herein, wherein a specified physical parameter of the one or more reference shape is a surface of the one or more reference shapes and allowing the points to move randomly in the direction transverse to the surface.

In any of the embodiments described herein, further comprising limiting the extent of movement of at least some of the point in the direction transverse to the surface.

In any of the embodiments described herein, wherein the points are positioned about the surface of the reference shape in a non-uniform manner.

In any of the embodiments described herein, further comprising one of the steps selected from the group consisting of: repeatedly mapping the one or more reference shapes on the work product and then performing digital generation of the series of unique variation shapes; and mapping the series of unique variation shapes generated onto the product.

In any of the embodiments described herein, wherein the mapping of the applicable one or more reference shapes/variation shapes are in columns on the work product.

In any of the embodiments described herein, wherein the applicable one or more reference shape/variation shapes is/are mapped in rows on the work product.

In any of the embodiments described herein, further including digitally generating the series of unique variation shapes by: selecting a first reference shape; selecting at least one additional reference shape for pairing with the first reference shape, and randomly selecting the extent that the variation shape resembles the first reference shape and the paired additional reference shape.

In any of the embodiments described herein, further comprising a plurality of additional reference shapes, and a specific additional reference shape randomly paired with the first reference shape.

In any of the embodiments described herein, further comprising: defining a physical parameter of each created unique variation shape with a plurality of points; and allowing the points to move randomly in at least one direction.

In any of the embodiments described herein, wherein the defined physical parameter of the unique variation shape is the perimeter of the unique variation shape and allowing the points to move randomly in the X and Y directions.

In any of the embodiments described herein, further comprising limiting the extent of movement of at least some of the point in the X and/or Y direction.

In any of the embodiments described herein, wherein the defined physical parameter of the unique variation shape is a surface of the unique variation shape, and allowing the points to move randomly in the direction transverse to the surface.

In any of the embodiments described herein, further comprising limiting the extent of movement of at least some of the points in the direction transverse to the surface.

In any of the embodiments described herein, wherein the generated variation shapes are mapped in columns on the workpiece.

In any of the embodiments described herein, wherein the generated variation shapes are also mapped in rows on the workpiece.

In any of the embodiments described herein, further comprising digitally generating the series of unique variation shapes by repeatedly mapping a first reference shape on the workpiece, selecting at least one additional reference shape, and for each reference shape mapped on the workpiece, creating a variation shape by randomly selecting the extent that mapped reference shape resembles the first reference shape and the at least one additional selected reference shape.

In any of the embodiments described herein, wherein the reference shape is repeatedly mapped in columns on the workpiece prior to the creation of the variation shape.

In any of the embodiments described herein, wherein the reference shape is also repeatedly mapped in rows on the work product prior to the creation of the variation shape.

In any of the embodiments described herein, further comprising defining a physical parameter of the created variation shape by a plurality of points, and allowing the points to move randomly in at least one direction.

In any of the embodiments described herein, wherein the defined physical parameter of the created variation shape is the perimeter of the variation shape, and including allowing the points to move randomly in the X and Y directions.

In any of the embodiments described herein, further comprising limiting the extent of movement of at least some of the points in the X and/or Y direction.

In any of the embodiments described herein, wherein the defined physical parameter of the created variation shape is a surface of the variation shape and including allowing the points to move randomly in the direction transverse to the surface.

In any of the embodiments described herein, further comprising limiting the extent of movement of at least some of the points in the direction transverse to the surface.

In any of the embodiments described herein, further comprising scanning the uniform workpiece and generating digital data based on the results of the scanning, and digitally generating the series of unique variation shapes based on the digital scanning data and on the specified physical parameters for the unique variation shapes.

In any of the embodiments described herein, wherein the one or more predetermined reference shapes are determined based on the scanning data.

In any of the embodiments described herein, wherein, in digitally generating the series of unique variations of the one or more predetermined reference shapes, limiting the allowed departure of the variation shapes from the one or more reference shapes.

In any of the embodiments described herein, wherein, in digitally generating a series of unique variations of the one or more predetermined reference shapes, limiting the allowed departure of the variation shapes from each other.

In any of the embodiments described herein, wherein the generated unique variation shapes have at least one physical specification in common selected from the group consisting a length dimension of the variation shape, a width dimension of the variation shape, a thickness dimension of the variation shape, the area of the variation shape, and the weight of the variation shape.

In any of the embodiments described herein, wherein the cutting paths for cutting the substantially uniform workpiece into the variation shapes are along at least portions of periodic wave patterns.

In any of the embodiments described herein, wherein the periodic wave patterns are in irregular patterns.

In any of the embodiments described herein, further comprising mapping the digitally generated series of unique variation shapes on the workpiece prior to generating cutting paths for cutting the work product.

In any of the embodiments described herein, wherein the work product is a food product.

In any of the embodiments described herein, wherein the food product is selected from the group including plant-based proteins, fish based proteins, meat-based proteins and cultured proteins; In any of the embodiments described herein, wherein the substantially uniform work product is formed in a shape selecting from the group consisting of: a sheet, a continuous sheet, a loaf, a continuous loaf, a cylinder, a continuous cylinder, a rectangle, a continuous rectangle, square, a continuous square, a slab, a continuous slab, a slug, a continuous slug, a strand, a continuous strand, a rope, a continuous rope, and other forms of woven strands and ropes.

In any of the embodiments described herein, wherein in the cutting of the work product, at least some of the cut edges of the work product are sloped from the vertical.

In any of the embodiments described herein, further comprising selecting the level of work product trim remaining after the work product has been portioned in the unique variations of naturally occurring work shapes.

In any of the embodiments described herein, further comprising cutting the trim into one or more selected shapes and/or sizes.

A method is provided for determining how to portion a substantially uniform work product into a series of unique variations of one or more predetermined reference shapes to resemble naturally occurring product shapes. The method includes: receiving by a control system specified physical parameters of the variation shapes; generating by the control system a series of unique variations of the one or more predetermined reference shapes based on specified physical parameters for the variation shapes: and generating by the control system cutting paths for portioning the substantially uniform work product into the generated variation shapes.

In any of the embodiments described herein, further comprising transmitting, by the control system, control signals to cause one or more cutters to cut the substantially uniform work product along the generated cutting paths, thereby portioning the substantially uniform work product into unique variations of naturally occurring work product shapes.

In any of the embodiments described herein, further comprising generating, by the control system, the series of unique variation shapes by defining a physical parameter of the one or more reference shapes by a plurality of points, and allowing, by the control system, the points to vary randomly in at least one direction.

In any of the embodiments described herein, wherein the specified physical parameter of the one or more reference shapes is the perimeter of the one or more reference shapes, and allowing, by the control system, the points to move randomly in the X and Y directions.

In any of the embodiments described herein, wherein the specified physical parameter of the one or more reference shape is a surface of the one or more reference shapes, and allowing, by the control system, the points to move randomly in the direction transverse to the surface.

In any of the embodiments described herein, further comprising, by the control system: generating the series of unique variation shapes by selecting a first reference shape, and selecting at least one additional reference shape for pairing with the first reference shape, and randomly selecting the extent that the variation shape resembles the first reference shape and the paired additional reference shape.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
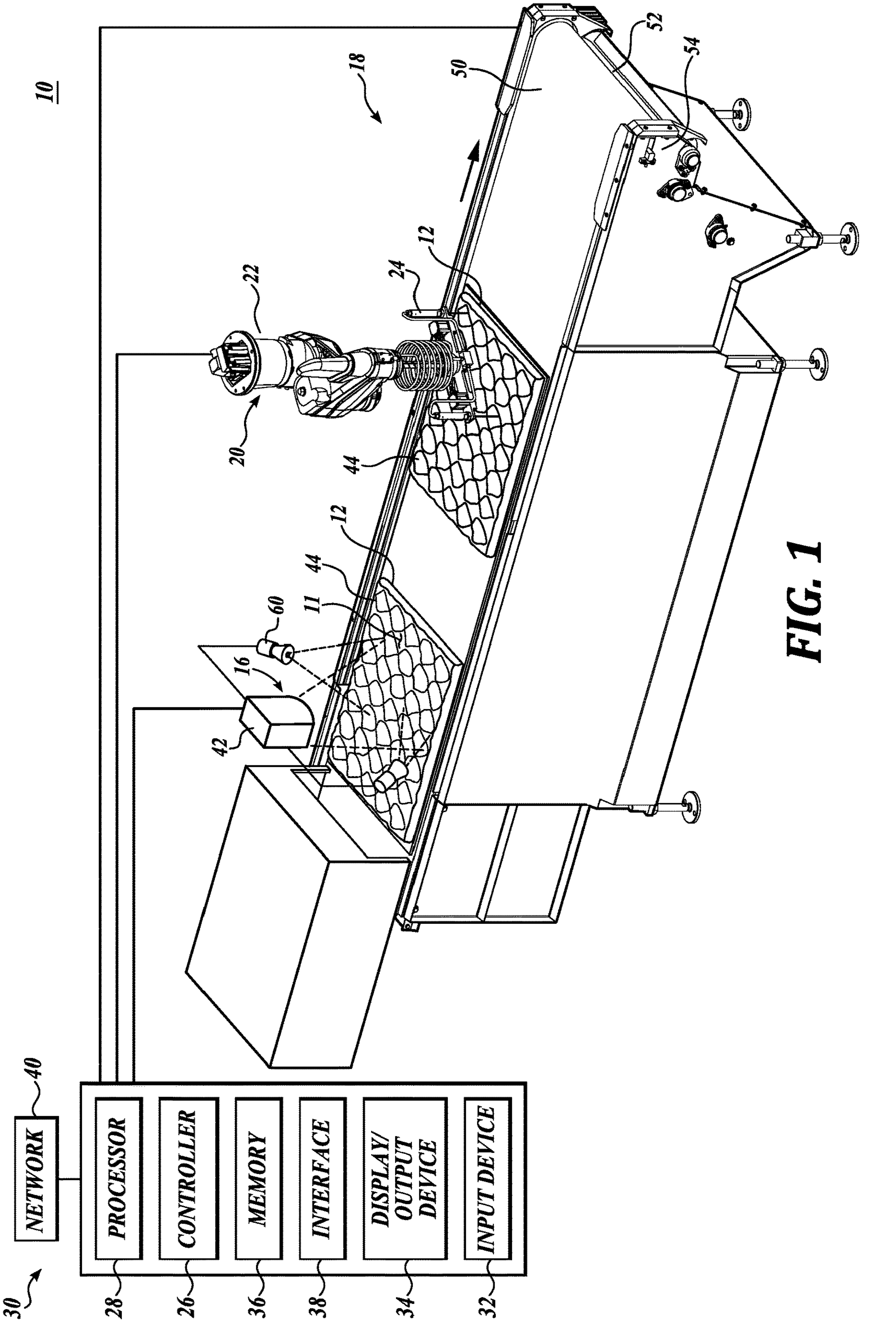
FIG. 1 is a pictorial, schematic view of an embodiment of the present disclosure showing the portioning of a substantially uniform work product into a series of unique shapes that resemble naturally occurring product shapes.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above,""below," "top," "bottom," "right hand," "left hand," "in," "out," "extended," "advanced," "retracted." "proximal," and "distal." These references and other similar references in the present application are only to assist in helping describe and understand the present disclosure and are not intended to limit the present invention to these directions.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units that are the same or similar are not repeated so as to avoid redundancy in the present application.

In the present application and claims, references to "food," "food products," "food pieces," and "food items," are used interchangeably and are meant to include all manner of foods. Such foods may include plant based protein products, vegetables, meat, fish, fruits, or other types of foods, such as cultured foods, including culture proteins. Also, the present systems and methods are directed to raw food products, as well as partially and/or fully processed or cooked food products.

Further, the system, apparatus and methods disclosed in the present application and defined in the present claims, though specifically applicable to food products or food items, may also be used outside of the food area. Accordingly, the present application and claims reference "work products," "work items" and "workpieces," which terms are synonymous with each other. It is to be understood that references to work products and workpieces also include nonfood items, as well as, for example, paper, cardboard, fabrics, carpet and upholstery. Further, the naturally occurring shapes may include foliage, leaves, rocks, feathers, etc.

The system and method of the present disclosure include the scanning of workpieces, including food items, to ascertain physical parameters of the workpiece comprising the size and/or shape of the workpiece. Such size and/or shape parameters may include, among other parameters, the length, width, aspect ratio, thickness, thickness profile, contour, outer contour, outer perimeter, outer perimeter configuration, outer perimeter size, outer perimeter shape, volume and/or weight of the workpiece. With respect to the physical parameters of the length, width, length/width aspect ratio, and thickness of the workpieces, including food items, such physical parameters may include the maximum, average, mean, and/or medium values of such parameters. With respect to the thickness profile of the workpiece, such profile can be along the length of the workpiece, across the width of the workpiece, as well as both across/along the width and length of the workpiece.

As noted above, a further parameter of the workpiece that may be ascertained, measured, analyzed, etc., is the contour of the work-piece. The term contour may refer to the outline, shape, and/or form of the workpiece, whether at the base or bottom of the workpiece or at any height along the thickness of the workpiece. The parameter term "outer contour" may refer to the outline, shape, form, etc., of the workpiece along its outermost boundary or edge.

The parameter referred to as the "perimeter" of the workpiece refers to the boundary or distance around a workpiece. Thus, the terms outer perimeter, outer perimeter configuration, outer perimeter size, and outer perimeter shape pertain to the distance around, the configuration, the size and the shape of the outermost boundary or edge of the workpiece.

The foregoing enumerated size and/or shape parameters are not intended to be limiting or inclusive. Other size and/or shape parameters may be ascertained, monitored, measured, etc., by the present system and method. Moreover, the definitions or explanations of the above specific size and/or shape parameters discussed above are not meant to be limiting or inclusive.

FIG. 1 schematically illustrates a system 10 implementing an embodiment of the present disclosure wherein sheets 11 of food products 12, for example, plant-based protein or plant-based meat, are received from a processing system 13 and transported on a moving support surface or transport plane in the form of a conveyor system 14. Although the food products 12 are shown as arranged in substantially uniform discrete sheets, the food products can be presented in a form a substantially uniform, continuous sheet. The food products can be received in other forms, for example, in the form of continuous extrusion of round, square, rectangular, or other cross sections. As another example, the food product can be in the form of a beef primal or a pork belly, which of course though similar in shape, are not uniform.

Reference to the food products being substantially uniform does not mean that the food product is entirely uniform. The food product can have naturally occurring variances, including for example, natural or organic edge or thickness variances or other variances.

The conveyance system 14 carries the food products 12 past the scanning system 16 for scanning the food products and generating digital data pertaining to various parameters of the food products, including those discussed above. Thereafter, the food products 12 are transported past a processing station 18 for portioning, cutting, trimming, etc. into portions that resemble naturally occurring, but unique shapes. The processing station includes a processing apparatus 20 in the form of a robotic actuator 22 onto which is mounted a dual headed cutter assembly 24 capable simultaneously following two separate cutting paths. As discussed below, the unique shapes of the portions harvested from the food products are determined by a control system 30.

The conveyor system 14, the scanning system 16, and the processing station 18, including the robotic actuator 22 and the dual headed cutter assembly 24, are controlled by a controller 26 operated by a processor 28 of the control system 30, as schematically shown in FIG. 1. The control system 30 includes an input device 32 (keyboard, mouse, touchpad, etc.), and an output device 34 (display, printer, etc.). The control system also includes memory unit 36 and an interface 38 for receiving signals and information from the conveyor system 14, scanning system 16, processing station 18, cutting apparatus 20, as well as from other data sources of the system 10, including as described more fully below. The control system 30 may be connected to a network 40. Also, rather than employing the local processor 28, a network computing system can be used for this purpose.

Generally, the scanning system 16 includes a scanner 42 for scanning the food products 12 to produce digital data relating to or representative of the physical specifications of the food products, and sends such data to the control system 30. The control system, using a scanning program, analyzes the scanning data to determine the location or locations of the food products 12 on the conveyance system 14 and develops physical parameters of the scan food products, including for example, the length, width, area, and/or volume distribution of the scanned food products. The processor 28 may also develop a thickness profile of the scanned food products, as well as the overall shape and size of the food products.

The control system can then model the food products to determine how the food products may be portioned, divided, or otherwise cut into intentionally created/designed unique shapes that resemble naturally occurring shapes accordance with one or more desired physical criteria, including, for example, the area, weight, thickness, edge contour, etc. of the portions. The control system 30, using the scanning data and/or a cutting or portioning program, determines how the food products are to be portioned or otherwise cut. The control system 30 then functions to control the cutting apparatus 20 portion or cut the food products 12 in accordance with the desired physical parameters mentioned above, including into unique portions 44 resembling naturally occurring portions or shapes. Such naturally occurring shapes can include, for example, the shapes of a chicken butterfly, a chicken or beef fillet, a pork chop, a chicken thigh, beef medallions. Another "naturally occurring" shape can be of a hamburger, chicken, or turkey patty, whether, round, rectangular, or square.

The system 10 may be used to carry out methods according to the present disclosure for portioning substantially uniform food products 12 into a series of intentionally created/designed unique variations of one or more predetermined reference shapes to resemble naturally occurring food product shapes. In basic form, the method includes scanning the uniform food product and generating digital data based on the results of the scanning. This data is used to generate a series of unique variations of one or more predetermined reference shapes based on one or more specified physical parameters for the unique variation shapes. Cutting paths are generated for cutting the substantially uniform food product 12 into the generated unique variation shapes 44. The control system 30 controls the operation of the cutting apparatus 22 cut the substantially uniform food product 12 along the generated cutting pass thereby portioning the substantially uniform food product into unique variations of naturally occurring food product shapes.

Next, describing the system 10 in more detail, the conveyance system 14 includes a powered belt 50 that slides over an underlying support or bed 52. The belt 50 defines a transport or support surface/plane for supporting the food products for travel along the conveyance system 14. The belt 50 is driven by drive rollers (not shown) mounted on a frame structure 54 that also supports the conveyor bed 52. The drive rollers are driven at a selected speed by a drive motor (not shown) in a standard manner. The drive motor can be composed of a variable speed motor, and thus adjust the speed of the belt as desired as the food products 12 are carried past the scanning system 16, the processing station 18, including the cutting apparatus 20.

An encoder, not shown, is integrated into the conveyor system 14, for example, at the drive rollers, to generate electrical pulses at fixed distance intervals corresponding to the forward movement of the conveyor belt 50. This information is routed to the control system 30 so that the location(s) of the food products 12 can be determined and monitored as the food products travel along the conveyor system 14. This information can be used to position the cutter assembly 24 as well as the movement of the robotic actuator 22.

The scanning system 16 can be of various configurations or types, including a video camera (not shown) to view the food products illuminated by one or more light sources 60. Light from the light sources 60 is extended across the moving conveyor belt 50 to define a sharp shadow or light stripe line projected across the conveyor, with the area forwardly of the transverse beam being dark. When no food product 12 is being carried by the conveyor belt 50, the shadow of the light stripe forms a straight line across the conveyor belt. However, when a food product 12 passes across the shadow line/light stripe, the upper, irregular surface of the food product produces an irregular shadow line/light stripe as viewed by the video camera angled downwardly on the food product and the shadow light/light stripe. The video camera directs the displacement of the shadow line/light stripe from the position it would occupy if no food product were present on the conveyor belt 50. This displacement represents the thickness of the food product 12 along the shadow line/light stripe. The length of the food product is determined by the distance along the belt travel that the shadow line/light stripes are created by the food product. In this regard, the encoder, which is integrated into the conveyance system 14, generates pulses at fixed distance intervals corresponding to the forward movement of the conveyor belt 50.

In lieu of a video camera, the scanning system 16 may instead utilize an X-ray apparatus (not shown) for determining the physical characteristics of the food product 12, including its shape, mass, and weight. X-rays may be passed through the object in the direction of an X-ray detector (not shown). Such X-rays are attenuated by the food product in proportion to the mass thereof. The X-ray detector is capable of measuring the intensity of the X-rays received by the detector, after passing through the food product. This attenuation is utilized to determine the overall shape and size of the food product 12 as well as its mass. An example of such an X-ray scanning device is disclosed in U.S. Pat. No. 5,585,605, incorporated by reference herein.

The foregoing scanning systems are known in the art, and thus are not novel per se. However, use of these scanning systems in conjunction with other aspects of the described embodiments is believed to be new.

The data and information measured/gathered at the scanning system 16 is transmitted to the control system 30, which records and/or notes the location of the food products on the conveyor belt 50 as well as data pertaining to physical parameters of the food products as discussed above. With this information, the processor 28, operating, for example, under the scanning system software, can develop an area profile as well as a volume profile of the food products. Knowing the density of the food products the processor can also control the weight of the portions generated from the food products.

Although the foregoing description discusses scanning by use of a video camera and a light source as well as by use of X-rays, other three-dimensional scanning techniques may be utilized. For example, such additional techniques may be by ultrasound or mire fringe methods. In addition, electromagnetic imaging techniques may be employed. Thus, the present invention is not limited to the use of video cameras or X-ray methods, but encompasses other two- and three-dimensional scanning technologies.

Figure 2:
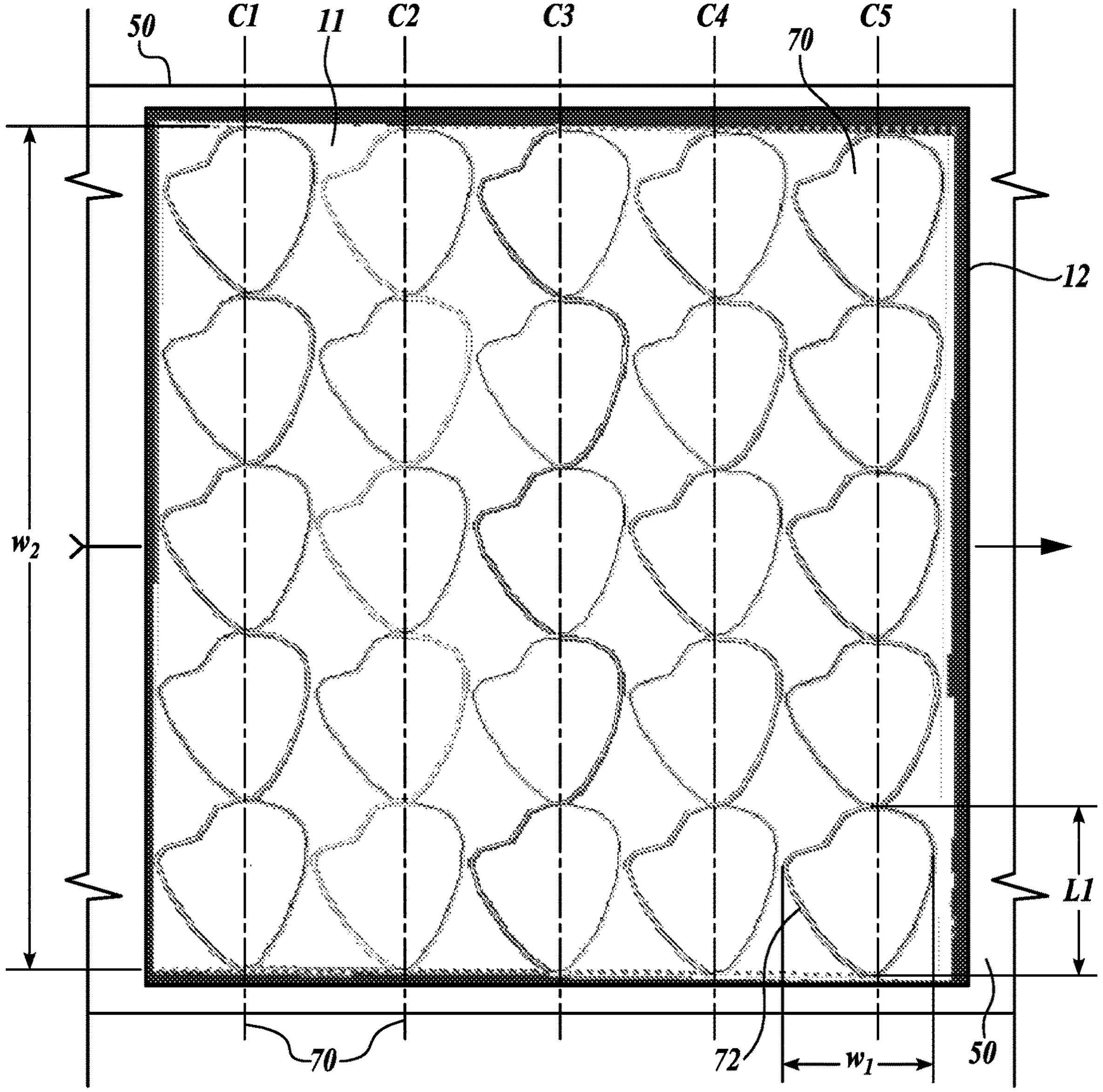
FIG. 2 illustrates a reference shape resembling a naturally occurring product shape that has been mapped onto a work product.
Figure 3:
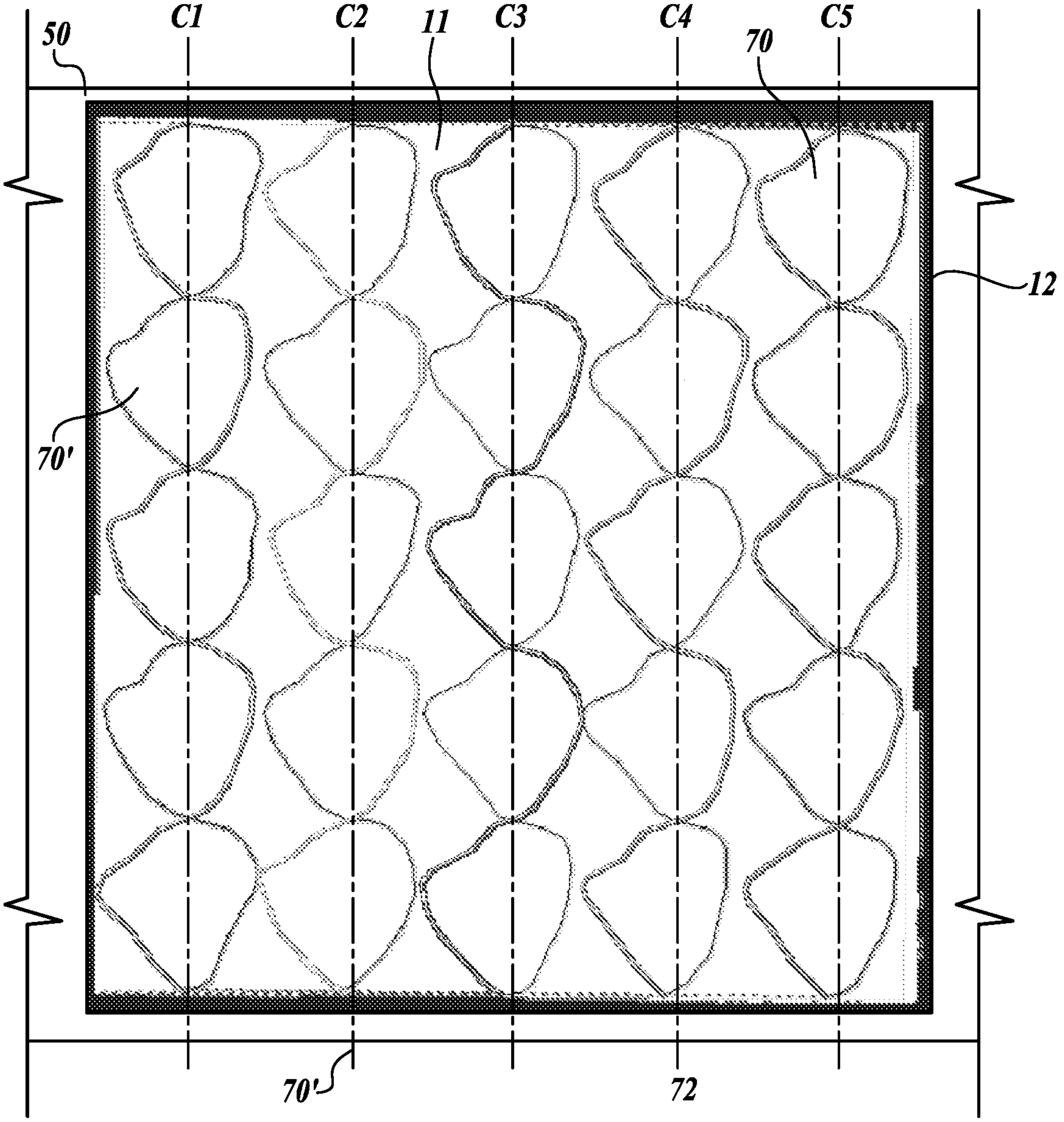
FIG. 3 is a view of FIG. 2, after the reference shapes have been converted into intentionally created unique variations shapes by jittering.

As noted previously, the system 10 of the present disclosure may be used to portion substantially uniform food products 12 into a series of intentionally created or designed unique variations of one or more predetermined reference shapes to resemble naturally occurring food product shapes. A first example of this method is illustrated in FIGS. 2 and 3. In FIGS. 2 and 3, as well as in FIGS. 4-10, the direction of the conveyor belt 50 is indicated by arrow 62.

The method begins with a selection of a reference shape which resembles a naturally occurring product. For example, in FIG. 2 the reference shape 70 resembles a chicken breast portion. In the process, the reference shape is mapped onto the food product 12, which is illustrated as in the form of a sheet 11. In this regard, the food product may be composed of, for example, a plant-based protein which has been processed into a substantially uniform sheet 11 of the particular thickness, length and width. Of course, there will be variations in these physical parameters, and the scanning of the food product 12 with the scanning system 16 can ascertain such physical parameter variations. This may be important if the portions cut from the food product are to be of substantial uniform weight, for instance if the cut portions are to be sold and served as chicken fillets.

When mapping the reference shape 70 onto the food product 12, it may be necessary to alter the configuration of the reference shape to so that the reference shape is successfully mapped onto the food product. For example, it may be that in mapping the reference shape 70 onto the food product at the end of the columns "C" of reference shapes, the last reference shape may not be totally within the side perimeter of the food product. Thus, it may be necessary to slightly shorten the length "L1" reference shape 70 so that all of the reference shapes, in particular column C, are within the perimeter of the food product 12. If one of the parameters of the portions created from the food product 12 is the weight of the portion, and if the length L1 of the reference shape is shortened, then the control system 30 is capable of increasing another dimension of the reference shape, such as the width "W1" of the reference shape.

Once the reference shapes 70 have been mapped onto the food product 12, as shown in FIG. 2, each of the reference shapes can be digitally altered to intentionally create unique shapes while still resembling the naturally occurring shape. One way to accomplish this goal is by a process which applicant refers to as "jittering." In the process of jittering, the perimeter of the reference shape 70 is map or defined by coordinate points positioned along the perimeter. Thereafter, each point is allowed to shift to set maximum degree in the X and/or Y direction in a random manner. Standard software tools are available in this regard.

The amount of maximum allowed shift may be controlled so that the resulting unique shape is limited in its variation from the reference shape as well as from the neighboring shape. Also, the coordinate points used to define the reference shape need not be uniformly spaced along the perimeter, but rather if a certain section of the reference shape is more significant than another section, then perhaps the coordinate points are positioned closer together in this section of the reference shape. Further, the amount that a point is allowed to shift may differ about the perimeter of the reference shape. In this manner, a certain section of the reference shape maybe more closely controlled than other sections of the reference shape.

FIG. 3 illustrates how each of the reference shapes 70 in FIG. 2 has been altered in shape due to jittering. As can be seen each of the reference shapes in FIG. 2 have been altered into a unique variation shape 70' in FIG. 3, while maintaining the general shape of the reference to 70 of FIG. 2. Further, the perimeters of the variation shapes 70' can be smoothed, using standard software techniques.

Next, the control system 30 generates cutting paths so as to cut the variation shapes 70' from the food product 12. In this regard, the variation shapes 70' are "stacked" in columns C so that the end of one variation shape 70' abuts the adjacent variation to 70'. This enables the cutting path to be in the form of a periodic wave with uniform nodes at the junction of adjacent variation shapes 70'. As an alternative, rather than defining the cutting powers as a periodic, but irregular, waveform, the cutting path may remain to one side of the center C of a column of the variation shapes 70'.

To facilitate laying out the reference shape 70 on the food product 12, and also to facilitate cutting the created unique variation shapes 70', the maximum dimension L1 of each variation shape 70' is the same. This is not a requirement as long as the total of the dimensions L1 of the variation shapes 70' in each column C does not exceed the width W2 of the food product sheet 11.

Once the cutting paths of the columns of variation shapes 70' have been defined, the control system 30 controls the operation of the cutting apparatus 20 to cut the variation shapes from the food product. This can be carried out quite rapidly in that the cutting apparatus 20 includes a robotic actuator 22 that operates a dual head cutter 24, for example, as disclosed in U.S. patent application Ser. No. 17/305,800, incorporated herein by reference. The cutters 24 can take various forms, for example, water jet cutters, narrow reciprocating blades or even small diameter rotating blades. If the feed rate of the food products from the processor 28 is not exceedingly fast, a single headed cutter may be used instead, or perhaps the robotic actuator 22 could be replaced with a Delta-actuator, or an X-Y actuator, both of which are shown in U.S. Pat. No. 9,778,651. This patent is incorporated herein by reference.

Figure 4:
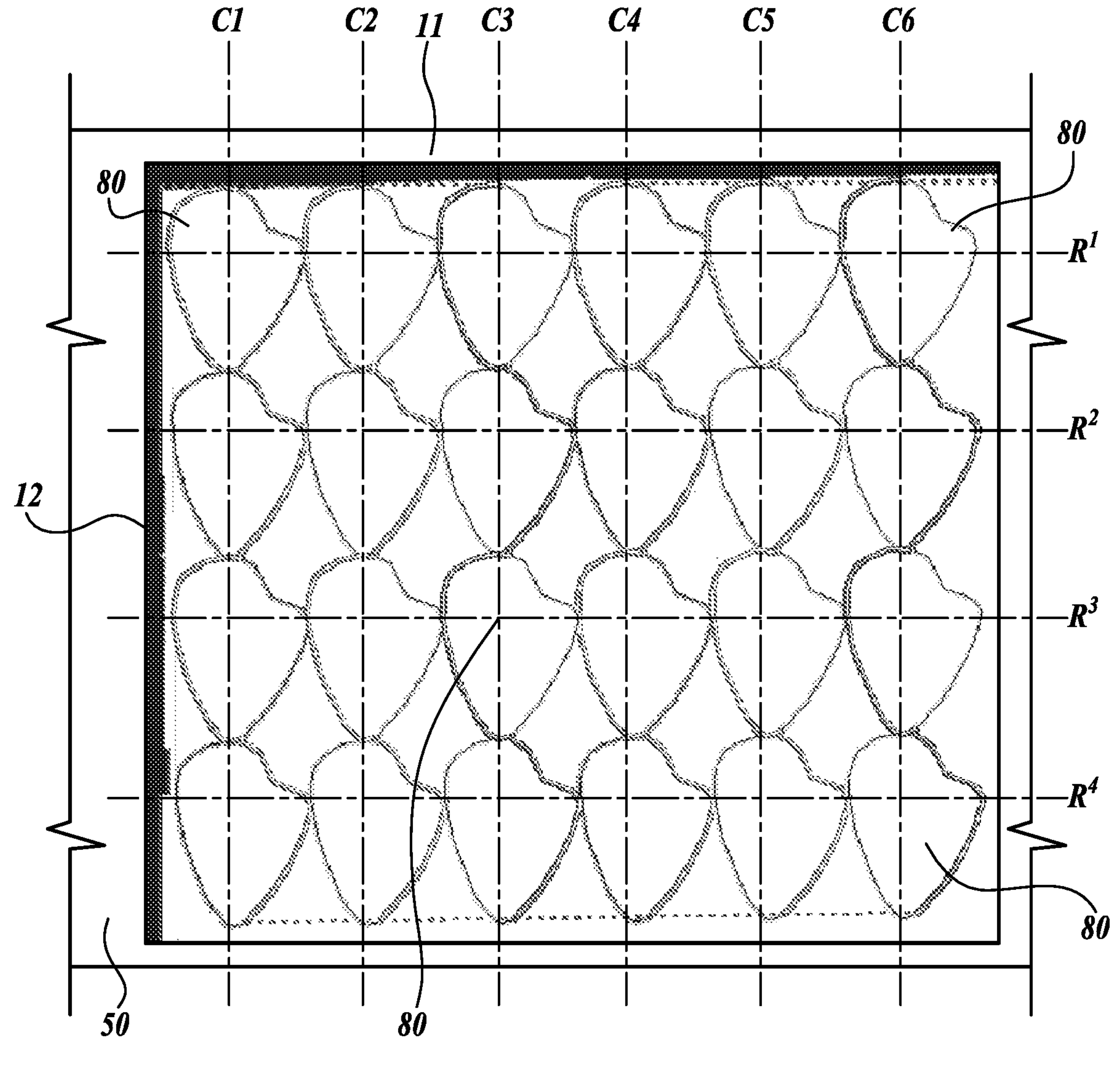
FIG. 4 illustrates a reference shape resembling a naturally occurring product shape that has been mapped onto a work product.
Figure 5:
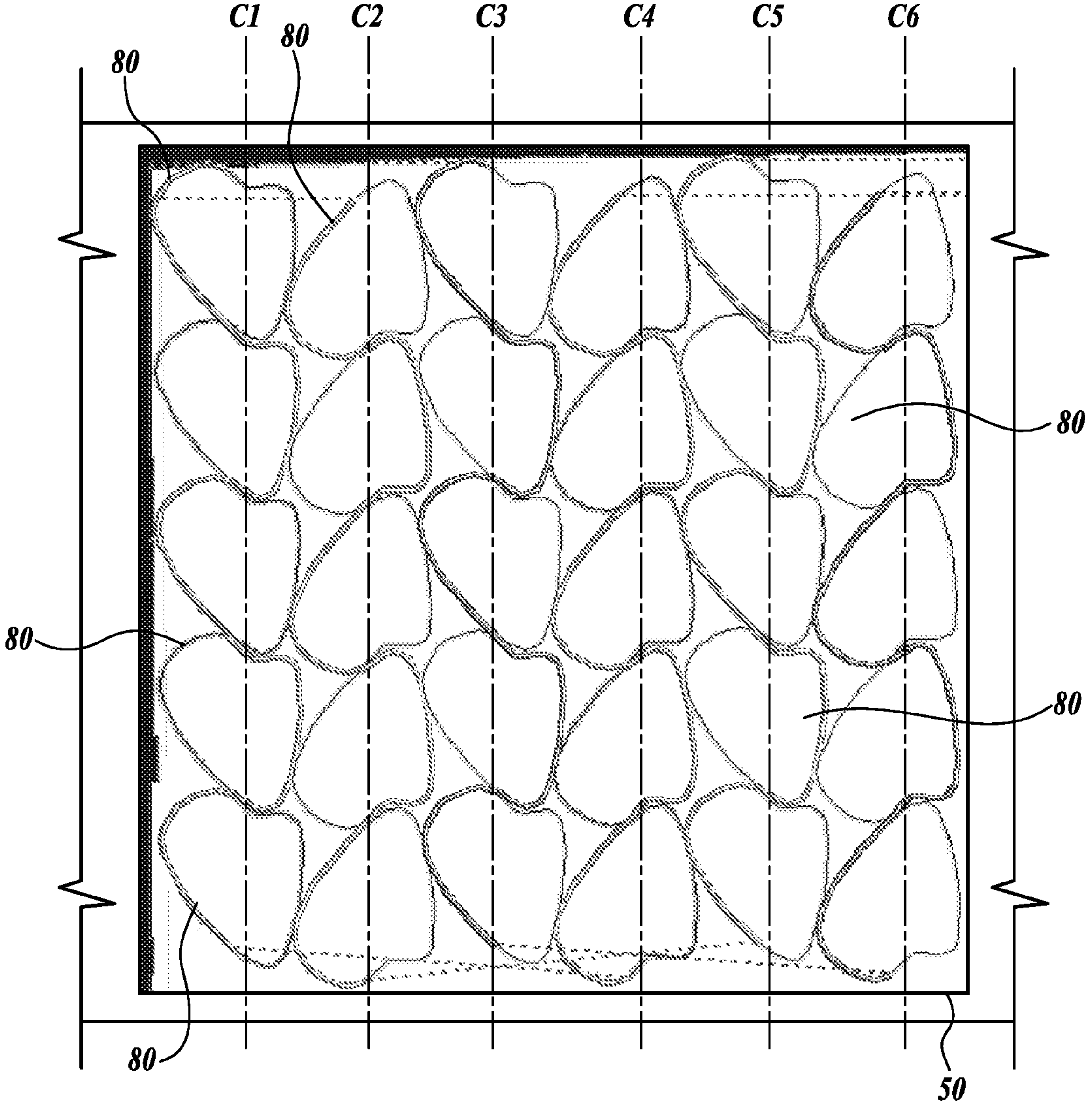
FIG. 5 is a view of FIG. 4 showing the reference shapes of alternating columns being rotated 180° from the orientation of FIG. 4, along an axis lengthwise of the direction of travel of the work product.

Next referring to FIGS. 4 and 5, reference shape 80 is illustrated as mapped/laid out on food product 12 in a manner similar to that shown in FIG. 2 in that the reference shapes are all alike and arranged in columns C and rows R. Although the illustrated reference shape is of a chicken fillet, the reference shape can be in other shapes or in the form of other naturally occurring food products. As can be appreciated there is substantial trim left in the food product after the reference shaped portions have been cut out of the food product. If this term cannot be used, then it becomes waste. If the trim can be utilized it is usually of less value than the portions per se, and so typically the amount of trim should be minimized or at least controlled to specified amounts.

FIG. 5 illustrates one method of reducing the amount of trim. As shown in FIG. 5, the reference shapes in columns C2, C4, and C6 are rotated about a horizontal axis (an axis extending along the direction of travel of the conveyor belt 59), so that the top of the reference shape to becomes the bottom of the reference shape. This "flipping", of the reference shapes in alternating columns reduces the open space between the reference shapes.

Also, as can be seen by comparing FIGS. 4 and 5, the reference shapes 80 are rotated slightly about a vertical axis relative to the surface of the conveyor belt, so that the reference shapes better nest together. Standard nesting algorithms can be used to accomplish this end. As apparent, the amount of trim in FIG. 5 is substantially less than in FIG. 4, so that the yield achieved by the arrangement in FIG. 5 is substantially greater than the yield achievable in FIG. 4.

Nonetheless, the trim can be recovered and used as is or after trimming or cutting. For example, if the food product in FIG. 5 is being portioned for use as chicken fillets, the trim could be recovered for use as chicken nuggets. The chicken nuggets could be in the form of the resulting trim as is, or the trim could be trimmed/cut into traditional rectangular or square nugget shapes by identifying trim areas that could be converted to usable nugget pieces or other pieces, such as popcorn shaped pieces, using reference shapes and using an optimizer algorithm to grow and determine the shape in the same way portions are cut.

The reference shapes 80 in FIG. 5 can be jittered, as described above with respect to FIG. 3, so as to create unique variation shapes, while at the same time minimizing the resulting trim. Nonetheless, the trim areas shown in FIG. 5 might be used for other purposes. For example, while the variation shapes might be used as breast meat fillets, or as chicken portions in chicken burgers, the trim areas might be used as chicken nuggets. In this regard, the cutting apparatus 20 could be employed to shape the trim pieces as desired, or the trim pieces could be simply used as created when the unique variation shapes are cut and removed from the food product 12.

When the trim is useful for other products through further processing it may be separated from the desired portions and collected for further processing in other steps. In some cases it may be desirable to set target levels for the amount of trim produced, if it is expected that the target levels may exceed the levels naturally produced. As example, if there is a need for 5% of the raw material to result in trim for some use, the control system would optimize cutting to produce 5% of trim.

In addition to being used as nuggets and smaller portions, other uses of the trim can be in soups or gravies. For such uses, the trim could be diced into cubes or other shapes and cut into random shapes as would naturally occur when cutting poultry or other meats. In this regard, the control system 30 can be programmed to produce a desire level or quantity of trim from the food product 12, which can be more than would occur if the reference shapes are tightly nested as in FIG. 5.

Figure 6:
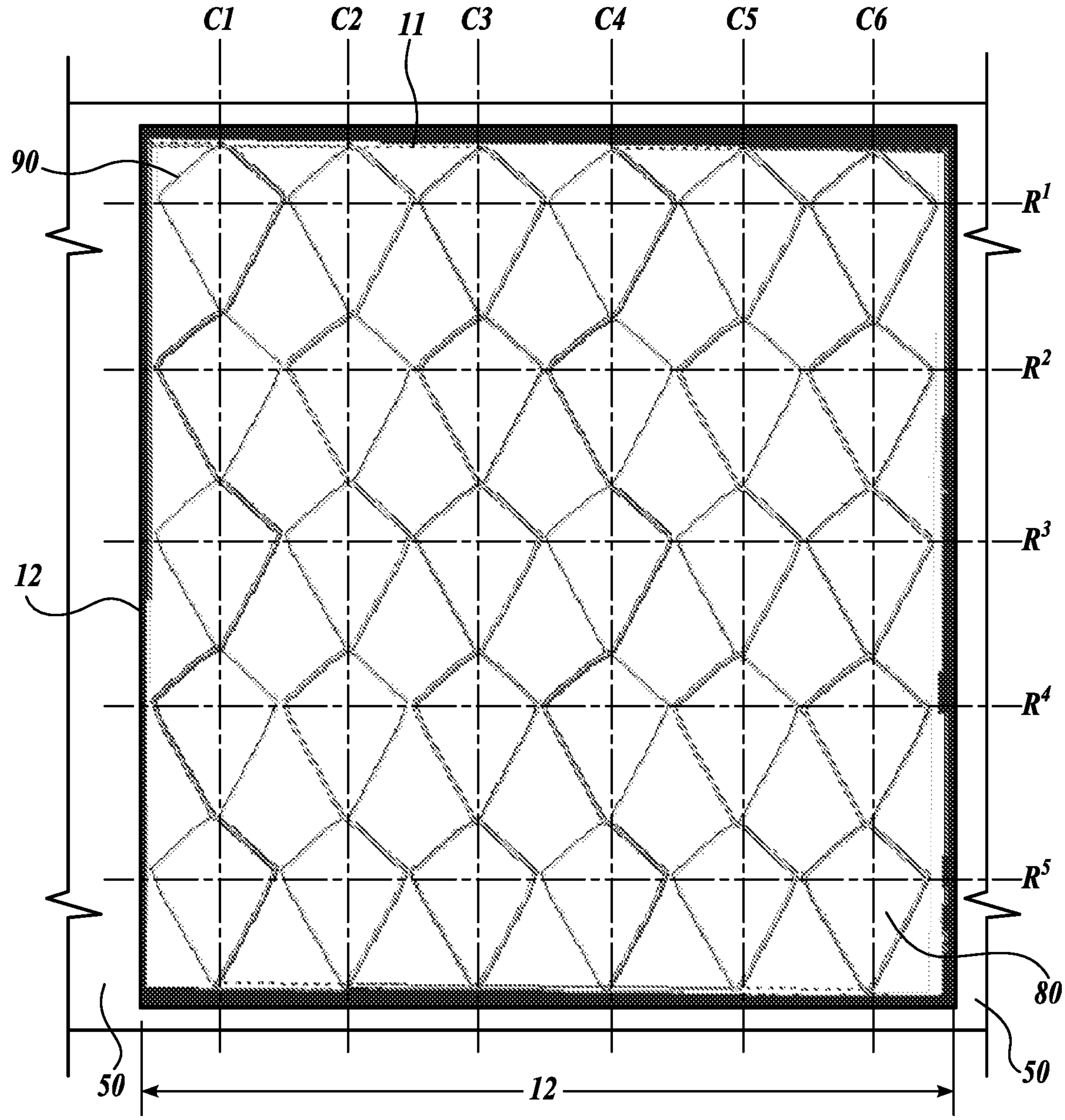
FIG. 6 illustrates a reference shape that resembles a naturally occurring product shape that has been mapped onto or product.
Figure 7:
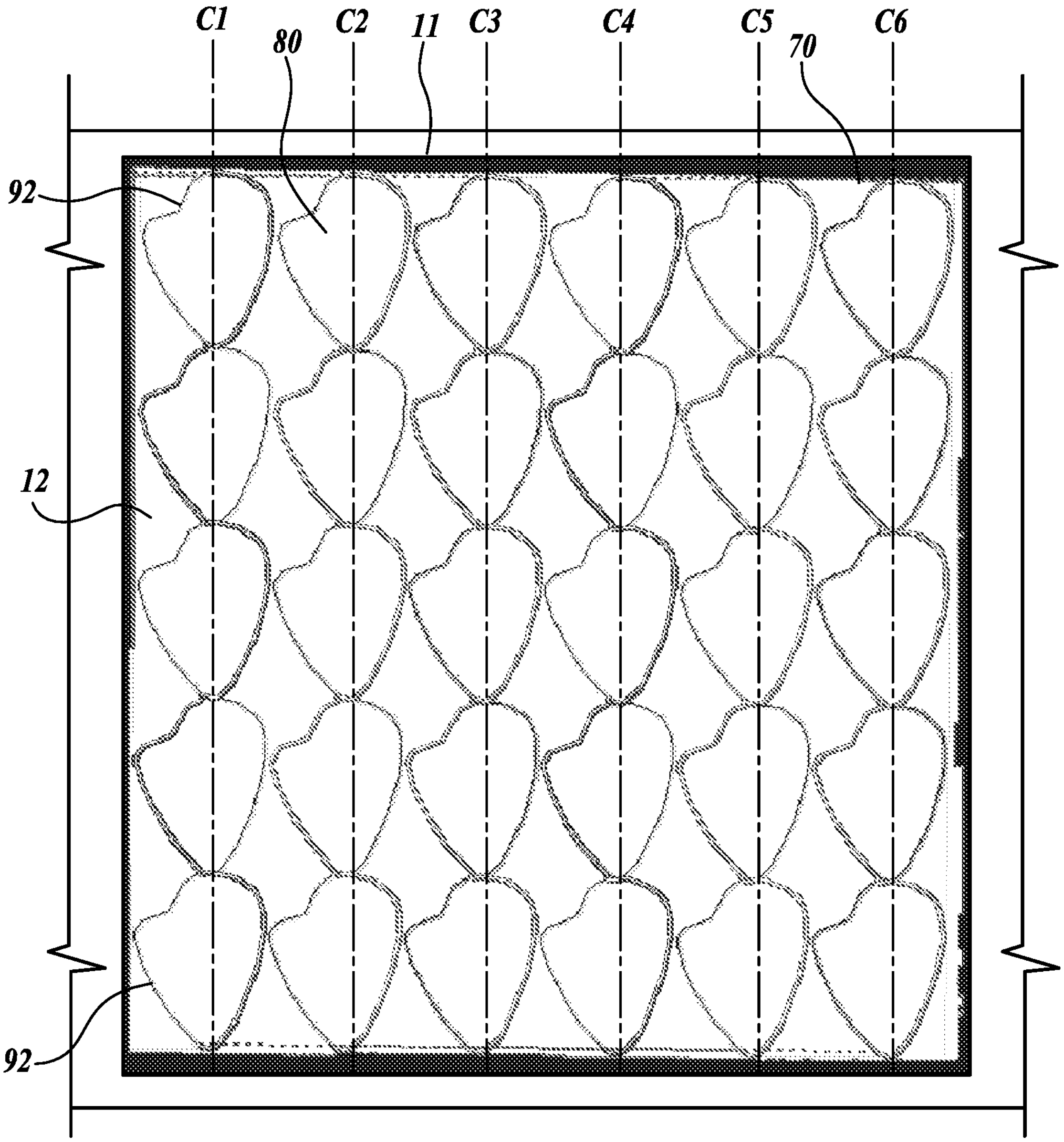
FIG. 7 illustrates a second reference shape that resembles a naturally occurring product that has been mapped on to the same work product as in FIG. 6.
Figure 8:
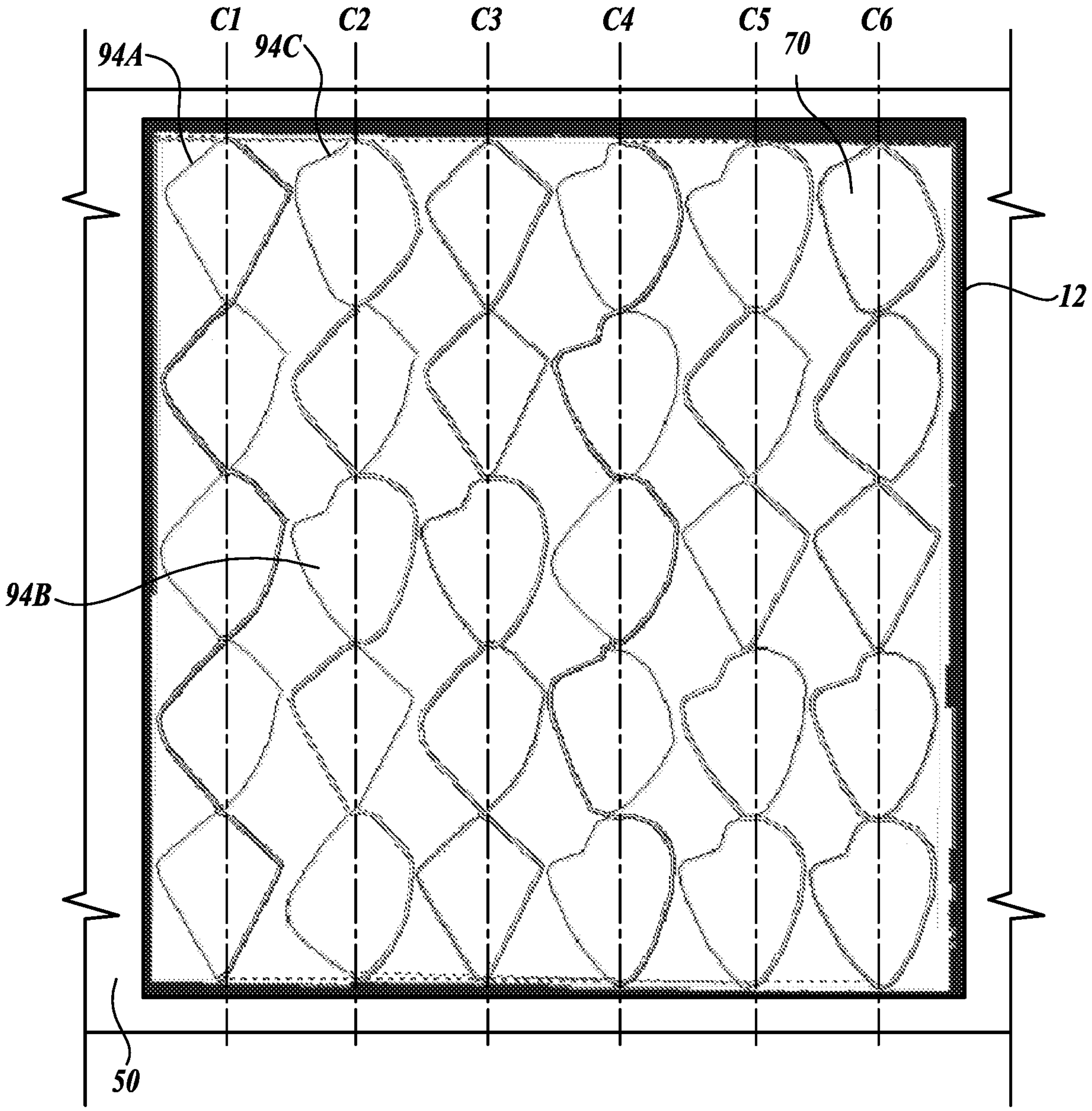
FIG. 8 illustrates the morphing of the reference shapes of FIGS. 6 and 7 so as to create unique variations shapes.

Next referring to FIGS. 6, 7, 8, 9, and 10, another technique for intentionally digitally creating unique variation shapes from of reference shape is illustrated. First referring to FIG. 6, reference shapes 90 are arranged in columns C and rows R along the length L2 of a sheet-shaped food product 12. In FIG. 7 a second reference shape 92 is also arranged in columns C and rows R along the length L2 of the same sheet-shaped food product 12 as in FIG. 6. FIG. 8 illustrates unique variation shapes 94 laid out in columns C and rows R in the same manner as in FIGS. 6 and 7. The unique variation shapes 94 are intentionally created by randomly "morphing" the reference shape 90 to a certain degree into the reference shape 92. The extent of such morphing can be from 0% to 100% and anywhere therebetween. As can be seen the variation shape 94A is similar in shape to reference shape 90, whereas the variation shape 94 B is similar to reference shape 92. On the other hand, variation shape 94C and 94D are quite different in shape from either reference shape 90 or 92. The extent of morphing of each of the individual reference shapes 90 shown in FIG. 6 is randomly determined using software techniques.

So as to enhance the uniqueness of the variation shapes 94, such variation shapes can also be jittered using the process described above. This results in the variation shapes 96 shown in FIG. 9. As apparent, the variation shapes 96 of FIG. 9 show increased uniqueness from the corresponding variation shapes 94 shown in FIG. 8.

Figure 9:
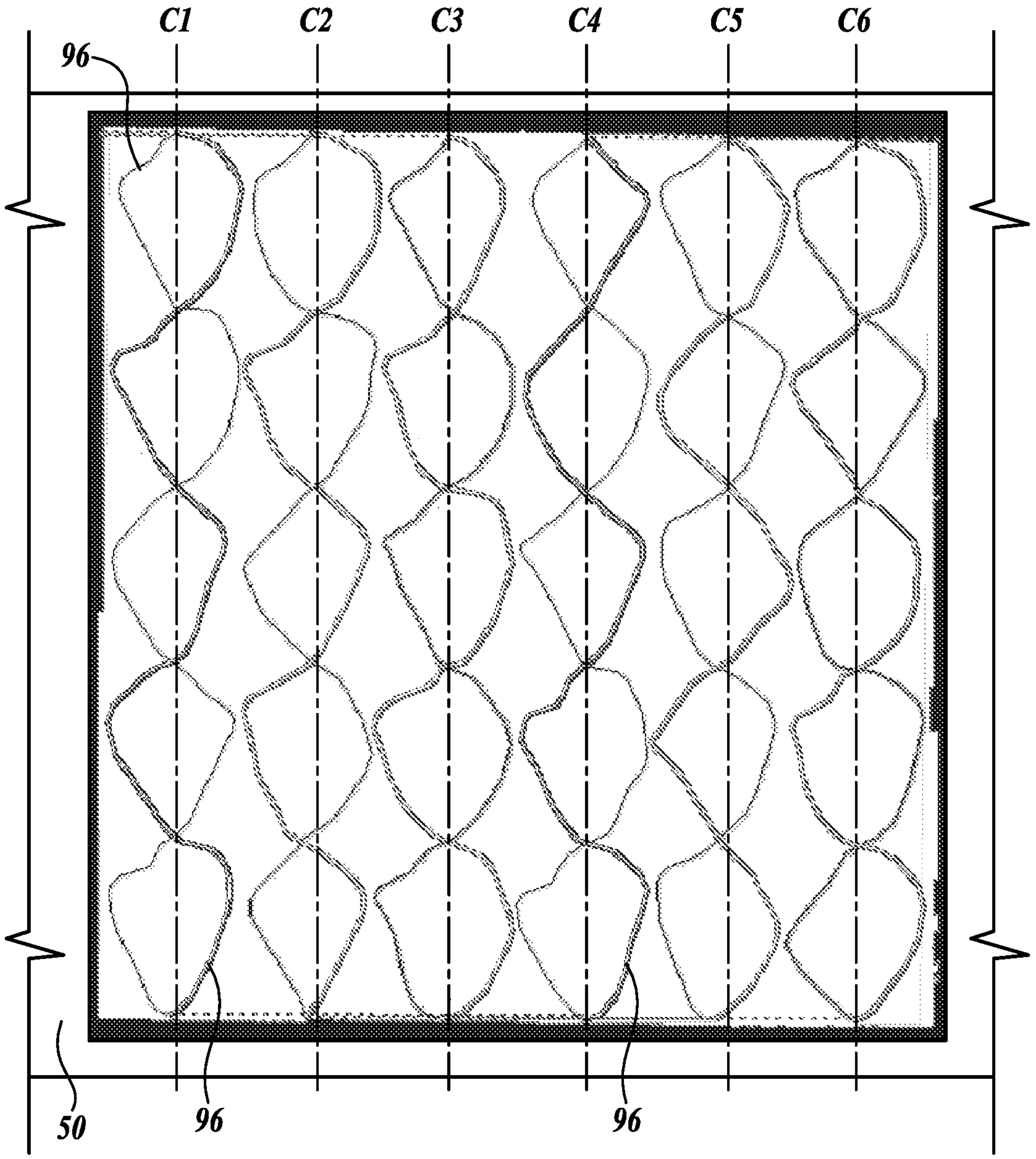
FIG. 9 is a view of FIG. 8 after the variation shapes have been processed by jittering.
Figure 10:
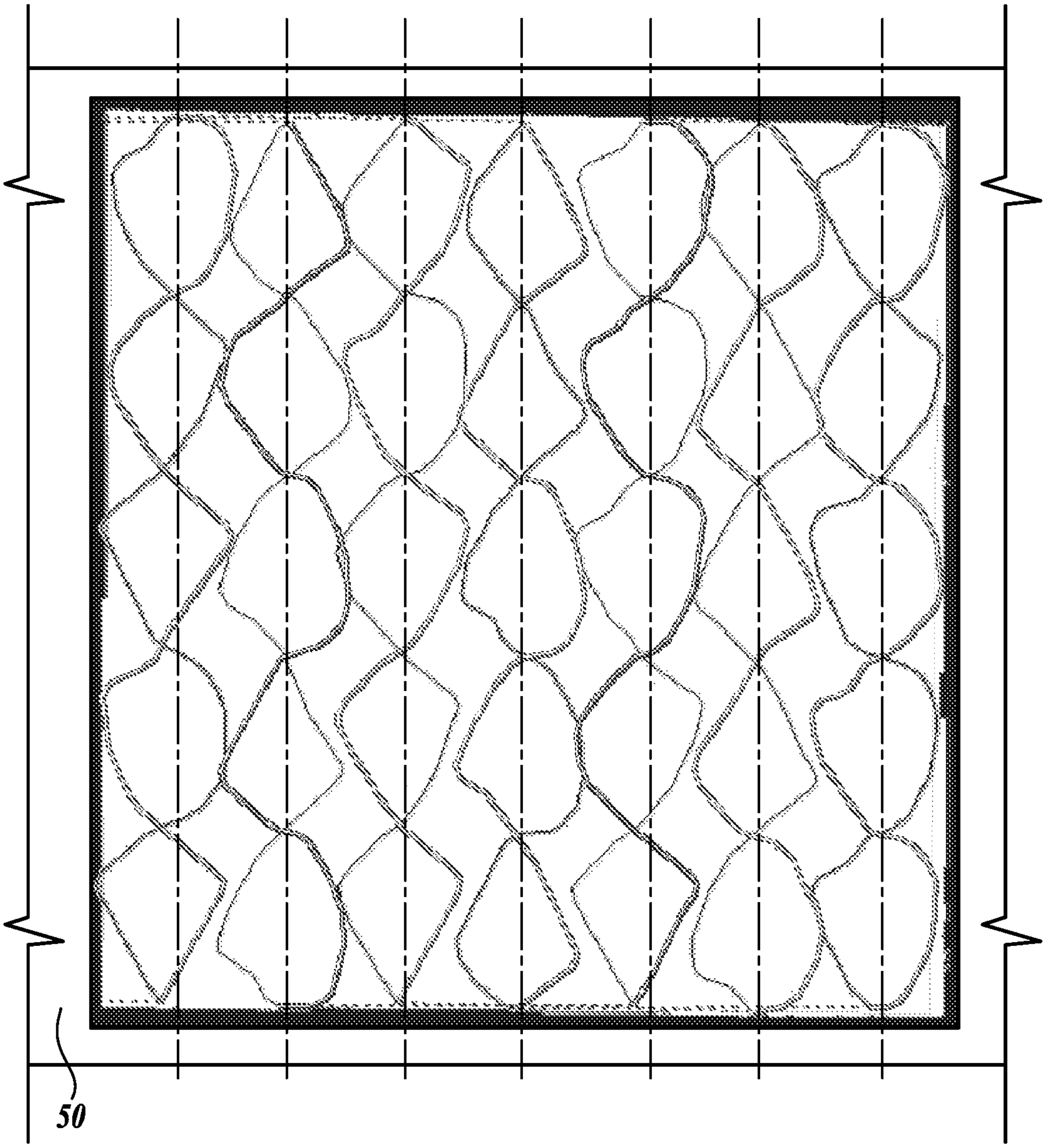
FIG. 10 is a view of FIG. 9 after the variations shapes of alternating columns have been rotated 180° from the orientation of FIG. 9, along an axis lengthwise of the direction of travel of the work product.

Further, to decrease the extent of trim the variation shapes 94 in FIG. 8 or the variation shapes 96 shown in FIG. 9 can the flipped is in the process as illustrated in FIG. 5 above. Moreover, after flipping the variation shapes 94/96 can be adjusted, typically by rotation, so as to more closely nest the variation shapes 94/96 with each other as shown in FIG. 10, thereby increasing the density of the variation shapes harvested from the food products 12.

FIG. 7 above illustrates a second reference shape 92 that is paired with original reference shape 90 for morphing into variation shapes 94. Additional reference shapes can be paired with original reference in shape 90. For example, such additional reference shapes can number from 1 to 10 or even more. In one aspect of the present disclosure, each of the additional reference shapes is paired with the original reference shape 90.

However, this is not a limitation of the present disclosure. Any two of the reference shapes might be paired together. As can be appreciated, this would result in a larger variation in the potential variation shapes. On the other hand, the complexity of the software for carrying out morphine using this strategy is increased in relationship to if the original reference shape 90 is paired with a randomly selected additional reference should 92.

The initial reference shapes 90, the additional paired reference shape 92, as well as the remainder of the additional reference shapes, may be stored in the memory unit 36. Also, any of the reference shapes discussed above may be introduced into the system 10 by drawing the reference shape(s) using the input device 32, or scanning the reference shapes(s) using a digital scanner and then transmitting the scanning data to the control system 30.

Although in FIGS. 2-10 the references shapes and the variation shapes are oriented so that the lengths L1 of the reference shapes are positioned transversely to the length or direction of travel of the conveyor belt 50, the reference shapes and the variation shapes can instead be oriented longitudinally to the length and direction of travel of the conveyor belt. One advantage of the orientation of the reference and variation shapes shown in FIGS. 2-10 is that the travel of the cutter 24 from column to column is a shorter distance than if the reference shapes were positioned longitudinally to the length and direction of travel of the conveyor belt. Nonetheless, either orientation of the reference shapes and variation shapes is possible.

In FIGS. 1-10, the food product 12 is illustrated as in the form of sheet 11. As noted above, the food product to be portioned can take other forms. For example, the food product to can be in the form of a continuous sheet of fixed or somewhat variable width. In such case the scanner can monitor the change in width of the food product and increase or decrease the scale of the reference shapes, for example, the length L1, so as to fit/map complete reference shapes onto the food product.

Other forms of the reference shapes can include, for example, a loaf shape, a continuous loaf, a cylinder shape, a continuous cylinder, a slab shape, a continuous slab, a slug shape, a continuous slug, a cube shape, a continuous form of a square cross-section, a rectangle shape, a continuous form of a rectangular cross-section; a strand, a continuous strand, a rope, a continuous rope, other forms of woven strand and ropes, etc.

In FIGS. 1-10, the reference shapes are first mapped onto the food product 12 before the variation shapes are created. However, the variation shapes can first be created, and then mapped on to the food product. This would be an option that would work well if the food product is created as a continuous sheet. The variation shapes can be created using one or more of the jittering, flipping, nesting and morphing techniques described above. The created variation shapes can then be mapped onto the food product, for example, in the same sequence as created.

The digital scanning information from the scanning system 16 can be employed to assist in sizing the variation shapes, such as establishing the length L1 of the variation shapes so as to fit as a whole unit onto the food product sheet 11. The data from the scanning system 16 can also be used to establish the overall area of each variation shape so that the variation shapes meet the weight requirement of the variation shape portions. Depending on changes in the thickness of the food product 12, the width W1 of the variation shapes may require adjustment.

As noted above, the portions cut from the work product 12 may be required to meet one or more physical parameters in addition to defining a unique shape that resembles a natural product. For example, the portions may be required to meet a minimum weight level as well as a maximum weight level, thus a set point weight range. In this regard, each of the variation shapes can be analyzed for the weight thereof, and if the weight of the variation shape is within the desired set point range, then the next variation portion is analyzed. However, if the weight of the variation shape is not within the desired set point range, an optimizer algorithm can be utilized to iteratively alter the shape of the variation portion until the desired set point weight is achieved. This can be performed by, for example, altering/moving the X-Y coordinates of selective points that define the perimeter of the variation shape.

The optimizer is provided with λ steps so that the change in the X-Y coordinate locations is not necessarily uniform from each iteration to the next. Rather, with the X steps, the optimizer has a sense for how aggressively to change the X-Y coordinates in the process of seeking an optimum solution. In this manner, the number of iterations necessary to reach an acceptable solution is reduced.

The optimization process undertaken by the processor 28 can employ a value function (or its negative/opposite-a cost function) to rank each of the iterations of the potential changed in the X-Y coordinates. In this regard, for each iteration, the selected designated physical attribute or characteristic (e.g., weight) is compared to an acceptable value range. For such attributes or characteristics, an acceptable value range is determined rather than just a single acceptable value. The cost function can be defined that has a value of 0.0 at the center of each range of each physical attribute or characteristic, with an increasing cost as the simulated values of the attribute or characteristic deviates work product center of the specified range.

Further, a weighing factor can be applied to the cost for the physical attributes or characteristics. Thereafter, the weighted costs of the designated attributes or characteristics are combined, such as by addition, to give a total cost. This analysis is carried out for the variation pieces that are to be harvested from the work product 12. As such, the total cost of the simulated variation portions can be determined.

It will be understood that the term "cost" is used herein to refer to the negative or opposite of the term "value." It is possible to carry out the foregoing analysis from the viewpoint of the value achieved by the simulated final pieces or slices. Thus, the terms "cost" and "value" are related in a sense that, with respect to a particular physical attribute or characteristic, an increase in the "cost" corresponds to a decrease in the "value."

The cost function definition can take almost any form, including a "one-sided" definition where an attribute or characteristic can never be above or below a threshold, and the target (zero cost) value is something other than in the middle of a range. An example of this is that the end of the final piece or slice should not extend beyond the edge of the actual workpiece.

Other cost functions that can be used, including:

1) the cost increases with deviation from the range midpoint, and continues increasing for characteristic values beyond the range;
2) the cost increases from a deviation from the range midpoint, with "hard" limits (for example, a large step-function increase) at the range limits;
3) there is no cost associated with values within the range, with "hard" limits at the range limits.

The "total cost" numbers can be analyzed using a multi-dimensional optimization technique, such as the "Gradient Descent" minimization algorithm, to expeditiously find an optimal size and location for the trimmed workpiece. Within a limited number of iterations of selected areas overlaid on the workpiece, it is possible to find an optimal solution without having to consider all of the perhaps thousands of potential sizes and positions of the area superimposed on the workpiece. Examples of non-linear algorithms similar to Gradient Descent include the Gauss-Newton method, the BFGS method, and the Levenberg-Marquardt method. Other algorithms or analysis methods may be utilized in this regard, including, for example, the Nieder-Mead method, differential evolution methods, genetic algorithms, and particle form optimization.

The method and system of the present disclosure may be operated with a plurality of optimization function analysis running at the same time. For example, a second optimization function can be employed in an effort to minimize the amount of trim that results when a work piece is portioned. The second optimization function can seek to minimize the trim by changing the shape of the variation shape to use some of the trim area, but which at the same time maintaining the requirement that the variation shape resemble a naturally-occurring portion.

In cases where a predetermined level of trim is desired for producing some further processed product, the second optimization function would seek to optimize the trim level to not less than or more than the desired level (i.e., 5% of trim).

While illustrative embodiments have been illustrated and described, it will be appreciated that various changes can be made therein without departing from the spirit and scope of the invention. For example, when cutting the work product into naturally occurring shapes, the edges of the portions being cut may be vertical relative to the plane of the work product, but also the cut edges may be sloped from the vertical so that in the downward direction the edge of the cut portion flares outwardly or inwardly. This flaring or beveling of the cut edge of the portion can occur randomly about the perimeter of the cut portion.

Also, although in the above figures a single layer of work product 12 is illustrated, the work product may be stacked in two or more layers and then the layers of the work product may be portion at the same time to form naturally occurring variation shapes.

The invention claimed is:

1. Portioning a substantially uniform edible food product in the form of a sheet having a length and a width into a series of unique variations of one or more predetermined reference shapes to resemble naturally occurring food product shapes, comprising: transporting the sheet of edible food product on a conveyor; digitally generating a series of unique variations of the one or more predetermined reference shapes arranged in columns extending along the width or length of the sheet, the reference shapes resembling naturally occurring food product shapes, the generated series of unique variation shapes are based on specified physical parameters for the variation shapes; mapping/applying the generated series of unique variation shapes over substantially the entire surface area of the edible food product; generating continuous cutting paths for portioning the substantially uniform edible food product in the form of the sheet into the mapped variation shapes, the continuous cutting paths extending between adjacent variation shapes; and controlling the operation of one or more cutters using a cutting stream to cut the edible food product along the mapped continuous cutting paths thereby portioning the edible food product into the unique variations of naturally occurring individual end food product shapes; and digitally generating the series of unique variation shapes by: selecting a first reference shape;

selecting at least one additional reference shape for pairing with the first reference shape, and randomly selecting the extent that the variation shape resembles the first reference shape and the paired additional reference shape.

2. The method of claim 1, further comprising:

digitally generating the series of unique variation shapes by specifying a physical parameter of the one or more reference shapes by a plurality of points extending along the perimeter of the one or more reference shapes; and allowing the points to vary randomly in at least one direction to generate the unique variation shapes.

3. The method of claim 2, further comprising allowing the points to move randomly in the X and Y directions.

4. The method of claim 1, further comprising digitally generating the series of unique variation shapes by specifying a physical parameter of the one more reference shapes by a plurality of points on the surface of the one or more reference shapes and allowing the points to move randomly in the direction transverse to the surface.

5. The method of claim 2, further comprising one of the steps selected from the group consisting of:

repeatedly mapping the one or more reference shapes on the food product and then performing digital generation of the series of unique variation shapes by the method of claim 2; and mapping the series of unique variation shapes generated by the method of claim 2 onto the food product.

6. The method of claim 1, further comprising a plurality of additional reference shapes, and a specific additional reference shape randomly paired with the first reference shape.

7. The method of claim 1, further comprising:
scanning the food product and generating digital data based on the results of the scanning; and
digitally generating the series of unique variation shapes based on the digital scanning data and on the specified physical parameters for the unique variation shapes.

8. The method of claim 1, wherein in digitally generating the series of unique variations of the one or more predetermined reference shapes, limiting the allowed departure of the variation shapes from the one or more reference shapes or from each other.

9. The method of claim 1, wherein the generated unique variation shapes have at least one physical specification in common selected from the group consisting a length dimension of the variation shape, a width dimension of the variation shape, a thickness dimension of the variation shape, the area of the variation shape, and the weight of the variation shape.

10. The method of claim 1, wherein the cutting paths for cutting the food product into the variation shapes are along at least portions of periodic wave patterns.

11. The method of claim 1, further comprising mapping the digitally generated series of unique variation shapes on the food product prior to generating cutting paths for cutting the food product.

12. The method of claim 1, further comprising selecting the level of food product trim remaining after the food product has been portioned in the unique variations of naturally occurring food product shapes.

13. The method of claim 12, further comprising cutting the trim into one or more selected shapes and/or sizes.

14. The method of claim 1, wherein the substantially uniform food product is in the form of a continuous sheet.

15. The method of claim 1, wherein the substantially uniform food product is selected from the group consisting of plant based food products, cultured meat, and cultured fish.

16. The method of claim 10, wherein the cutting paths for cutting the food product into the variation shapes are along at least portions of continuous periodic wave patterns.

17. The method of claim 1, wherein the cutting path is generated so that the end of one variation shape abuts an adjacent variation shape.

18. The method of claim 1, wherein the substantially uniform food product is a protein food product.

19. Portioning a substantially uniform edible food product in the form of a sheet having a surface area length and a width into a series of unique variations of one or more predetermined reference shapes to resemble naturally occurring food product shapes, comprising: transporting the sheet of edible food product on a conveyor; digitally generating a series of unique variations of the one or more predetermined reference shapes arranged in columns extending along the width or length of the sheet, the reference shapes resembling naturally occurring food product shapes, the generated series of unique variation shapes are based on specified physical parameters for the variation shapes; mapping/applying the generated series of unique variation shapes over substantially the entire surface area of the edible food product; generating continuous cutting paths for portioning the substantially uniform edible food product in the form of the sheet into the mapped variation shapes, the continuous cutting paths extending between adjacent variation shapes; and controlling the operation of one or more cutters using a cutting stream to cut the edible food product along the mapped continuous cutting paths thereby portioning the edible food product into the unique variations of naturally occurring individual end food product shapes; and digitally generating the series of unique variation shapes repeatedly mapping a first reference shape on the food product; selecting at least one additional reference shape; and for each reference shape mapped on the food product, creating a variation shape by randomly selecting the extent that mapped reference shape resembles the first reference shape and the at least one additional selected reference shape.

* * * * *